Sept. 20, 1971 TOMOO ISHIHARA ET AL 3,605,507
AUTOMATIC TRANSMISSION
Filed April 10, 1969 3 Sheets-Sheet 1

INVENTORS
Tomoo Ishihara
Katsuya Suzuki
Hajime Asai
Hisaji Nishikawa
Shin Ito

BY George B. Oujevolk
ATTORNEY

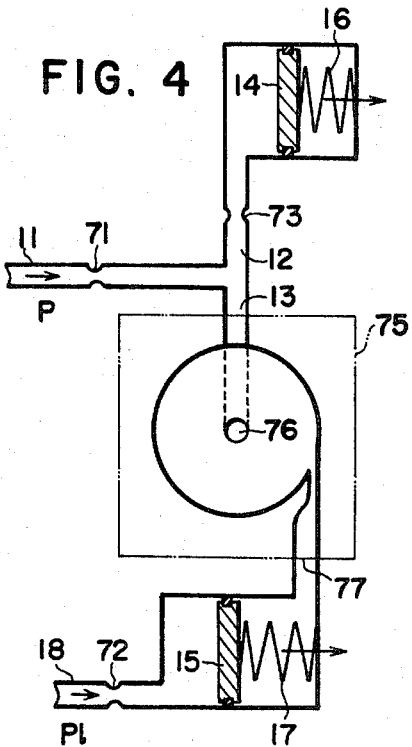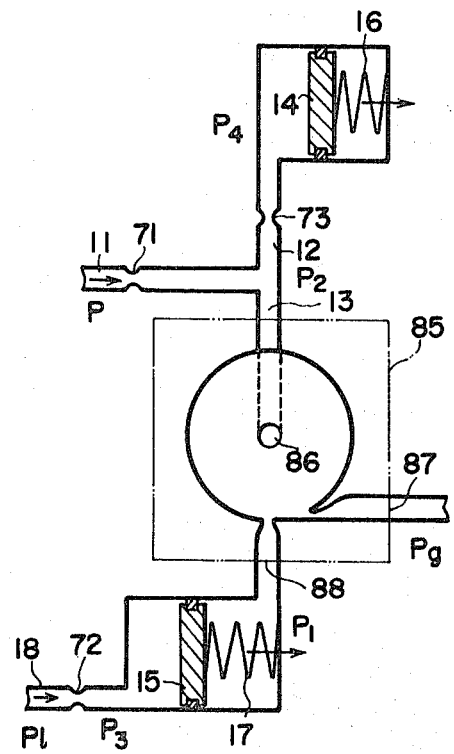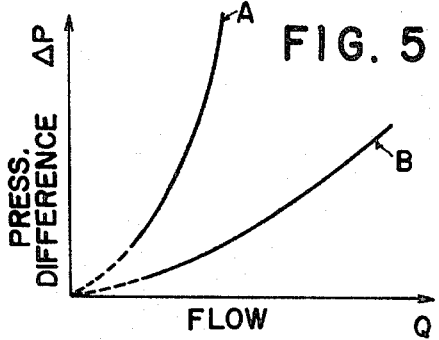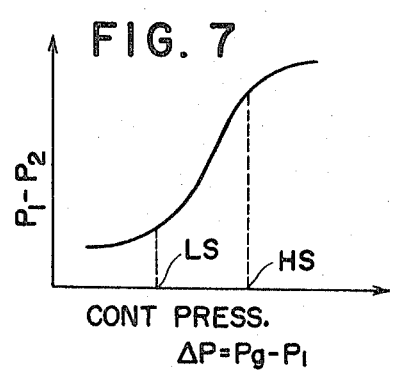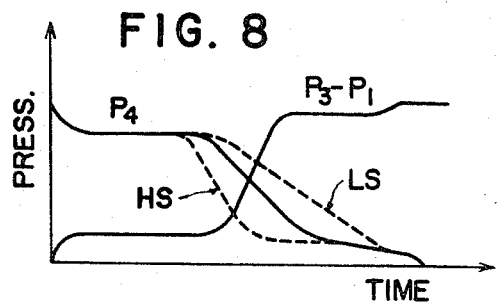

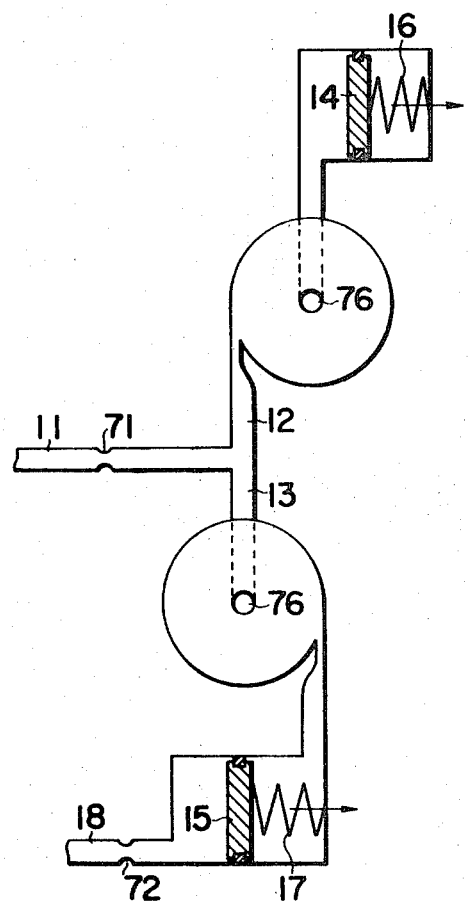

United States Patent Office 3,605,507
Patented Sept. 20, 1971

3,605,507
AUTOMATIC TRANSMISSION
Tomoo Ishihara, Tokyo, Katsuya Suzuki, Nagoya, and Hajime Arai, Hisaji Nishikawa, and Shin Ito, Toyota, Japan, assignors to Toyota Jidosha Kogyo Kabushiki Kaisha, Toyota-cho, Toyota-shi, Aichi-ken, Japan
Filed Apr. 10, 1969, Ser. No. 815,070
Claims priority, application Japan, May 28, 1968, 43/35,689
Int. Cl. F15b *15/22;* F16d *67/04;* F16h *57/10*
U.S. Cl. 74—761  4 Claims

ABSTRACT OF THE DISCLOSURE

In general, in a fluid automatic transmission composed of a torque converter and a planetary gear system provided with a multiple disc clutch and a brake band, when the vehicle is running in drive range it is unable to avoid shock given to the driver at the time of automatic gear change for up-shift or down-shift of speed. The control system according to the present invention is intended to prevent occurrence of the above shock which gives the driver an uncomfortable feeling or uneasiness by means of comparatively simple methods. That is, a pure fluid element, for instance, a fluid amplifier is provided on one or both of the pipe-lines for applying or relieving hydraulic pressure to the multiple disc clutch servo piston and to the brake band servo piston and by utilizing the different resistance characteristics of this pure fluid element in the forward and reverse directions of the pressure oil, a difference of time constant is produced between engaging and disengaging of the clutch and the brake band, whereby it is contemplated that the multiple disc clutch is slowly engaged for shifting up the speed after the brake band has been disengaged and the brake band is slowly engaged for shifting down the speed after the multiple disc clutch has been disengaged, thus reducing the shock at time of automatic gear change to minimum. Moreover, the present invention contemplates that the governor pressure having relation to the vehicle speed is applied to the control port of said fluid amplifier and a difference of the shock at time of automatic gear change caused between high speed and low speed at which the vehicle is running in the drive range is also eliminated, so that a more comfortable and almost shockless automatic gear change can be accomplished.

BACKGROUND OF THE INVENTION

Field of the invention

The present invention relates to a control system of a fluid automatic transmission adapted for use with motive power particularly with motor vehicles.

Description of the prior art

This kind of the fluid automatic transmission is in general composed of a so-called torque converter utilizing oil as a torque transmission medium, a planetary gear system composed of a plurality of sun gears and planetary gears, and a multiple disc clutch and a brake band for changing over this gear system. The multiple disc clutch and brake band are engaged or disengaged by the hydraulic control system and the change-over for "Neutral," "Low," "Drive" or "Reverse" etc. is carried out by operation of a manual valve provided in the hydraulic control system. Particularly, in the fluid automatic transmission, when the shift lever has been set at the drive range, low speed gear and high speed gear are automatically changed over in accordance with an amount of depressing of the accelerator pedal and a vehicle speed, thus assuring economical running as well as easy driving.

The change-over for low speed gear and high speed gear is to be accomplished by engaging or disengaging of the above multiple disc clutch and brake band, however the clutch and brake band are so arranged that if one is engaged the other is disengaged.

For this purpose an orifice has hitherto been provided in each pipe-line and the operating time of each orifice has been regulated. However, it is not possible to regulate the resistance at time of applying the hydraulic pressure independently of that at time of relieving the hydraulic pressure due to the characteristics of the orifice, so that shock cannot be prevented from appearing at time of automatic gear change thus giving an uncomfortable feeling or uneasiness to the driver.

OBJECTS OF THE INVENTION

A general object of this invention is to reduce the shock to minimum or to prevent the occurrence of any shock at time of automatic gear change during the running period in the drive range in the fluid automatic transmission as previously explained, particularly to accomplish such suppression of shock by means of a simple construction.

SUMMARY OF THE INVENTION

According to this invention, in a fluid automatic transmission which is composed of a torque converter, a planetary gear system interconnected to an output shaft of said torque converter, and a multiple disc clutch and a brake band for changing over the reduction ratio of said gear system, said multiple disc clutch and brake band are so constituted as to be engaged or disengaged simultaneously by applying or releasing the hydraulic pressure. To avoid such simultaneous action, a pure fluid element is provided on at least one of the pipe-lines to the multiple disc clutch and brake band for applying or releasing the hydraulic pressure. With this element the multiple disc clutch is slowly engaged for changing over the gear from low speed to high speed after the brake band has been disengaged and the brake band is slowly engaged for changing over the gear from high speed to low speed after the multiple disc clutch has been disengaged.

As a pure fluid element, a fluid diode of a vortex type or a cup type can be employed. When this fluid diode is provided on one of the pipe-lines to the multiple disc clutch and brake band an orifice is provided on the other pipe-line, and both resistance characteristics of the lines are to be suitably selected with regard to each other so that the operating time constant of the hydraulic pressure line at the orifice side may lie between two different time constants in the forward and inverse operations which the hydraulic pressure line at the fluid diode side possesses. Moreover, said fluid diode may be employed for each side of these pipe-lines.

Furthermore, in this sort of fluid automatic transmission, by changing the operating time constants of the multiple disc clutch and brake band according to the vehicle speed at the time of gear change, a more comfortable and almost shockless speed change can be accomplished. Also for this purpose, as a pure fluid element, for instance a vortex amplifier may be employed and the hydraulic pressure relative to the vehicle speed is led to the control port of this amplifier. This is due to the fact that because of the speed variation being large when the vehicle is running at a high speed, the operation of the mutual inter-connection between the input and output shafts from the neutral condition during the speed changing period must be carried out as slowly as possible.

The invention will be more fully understood from the following detailed description and the accompanying drawings, in which:

BRIEF DESCRIPTION OF THE DRAWINGS

FIG. 4 present a hydraulic control diagram according to the present invention;

FIG. 5 depicts a resistance characteristic diagram of a fluid diode;

FIG. 6 is a hydraulic control diagram of another embodiment of the present invention;

FIG. 7 and FIG. 8 each shows pressure characteristic curves for an explanation of the present invention;

FIG. 9 is a hydraulic control diagram of yet another embodiment of the present invention.

DESCRIPTION OF A PREFERRED EMBODIMENT

Figure 1:
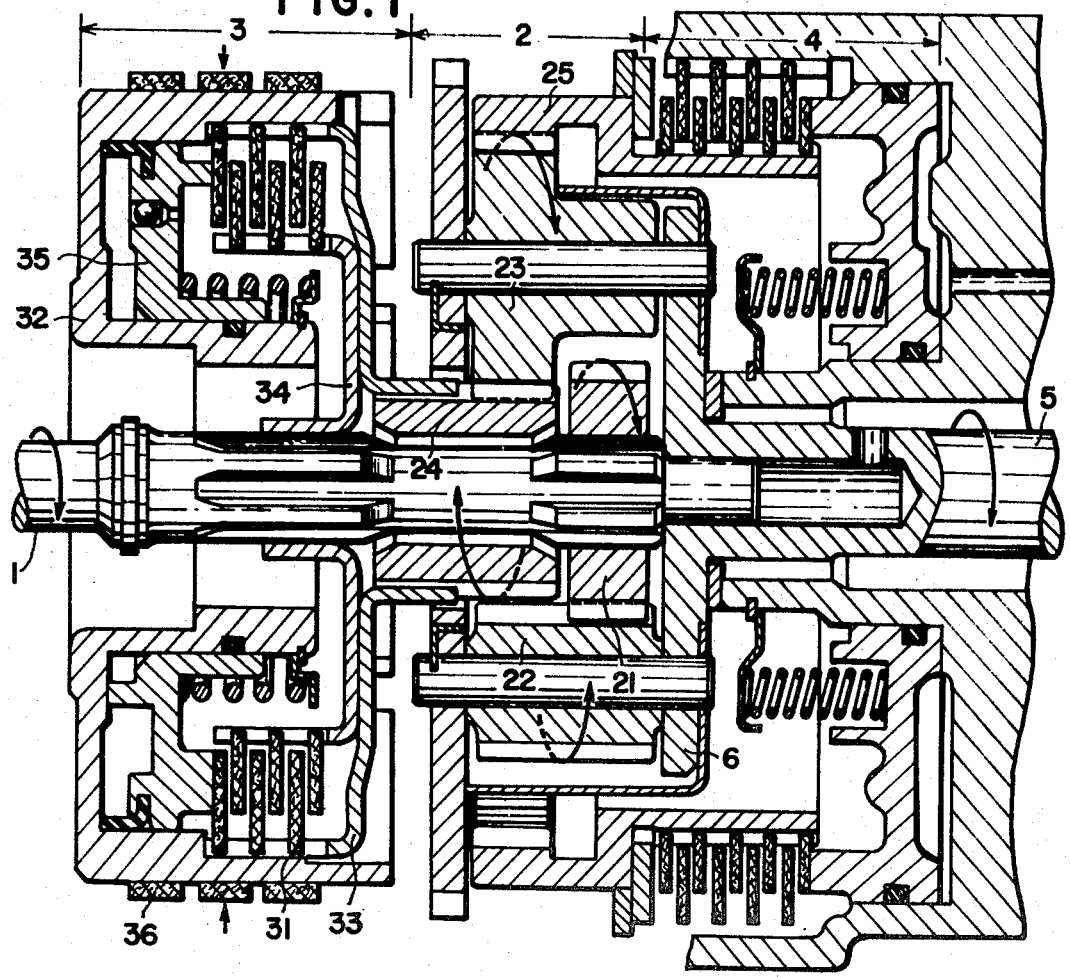
FIG. 1 is a schematic view of a speed change gear unit of an automatic transmission to which the present invention is applicable.
Figure 2:
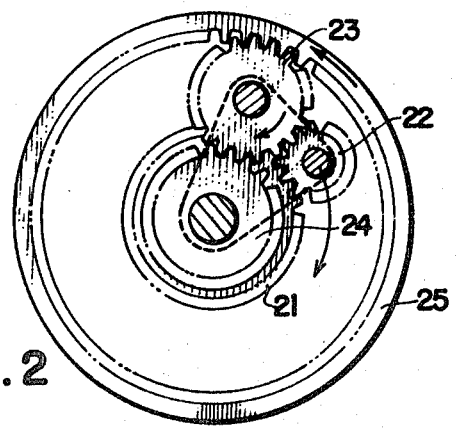
FIG. 2 shows a front view of a planetary gear system for FIG. 1.

Referring to FIG. 1 and FIG. 2, there is an input shaft 1 interconnected to a torque converter (not shown in the drawings) to which a prime mover such as a combustion engine is interconnected. On the input shaft is a planetary gear system 2 with an input sun gear 31, a long pinion 22, a short pinion 23, an intermediate sun gear 24, a ring gear 25. There also is a multiple disc clutch 3, a plurality of clutch plates 31, a clutch drum 32, a clutch flange 33 interconnecting the intermediate sun gear 24 with this drum 32, a clutch hub 34, a clutch piston 35, and a brake band 36. Then there is also a reverse clutch 4 which is engaged when the above multiple disc clutch 3 and brake band 36 are disengaged and locks the ring gear 25 thus causing the output shaft to rotate in the reverse direction at a reduced speed. The long pinion 22 and short pinion 23 of the planetary gear system 2 are held on a planetary gear carrier 6 incorporated with output shaft 5 in a body.

FIG. 1 shows a condition of the gear system in the low speed in which the brake band 36 is engaged by a servo piston to lock the clutch drum 32. Accordingly, the intermediate sun gear 24 is held stationary and by the rotation from the input shaft 1 the short pinion 23 is moved around the periphery of this stationary intermediate sun gear 24 and the planetary carrier incorporated in a body with the pinion pins rotates at a reduced speed in the same direction as the input shaft to rotate the output shaft 5 as shown in FIG. 1.

When the gear system is in the high speed, the hydraulic pressure is applied to the left side of the clutch piston 35 to engage the multiple disc clutch 3 and on the other hand the brake band 36 is disengaged.

Thus, the intermediate sun gear 24 is incorporated with the input shaft 1 in a body through the multiple disc clutch 3 and rotates together with the input sun gear 21. The long pinion 22 and short pinion 23 are meshed with sun gears 21, 24. They cannot have self-rotation and are in the locked condition. Thus the input shaft 1 is directly coupled with the output shaft 5.

In such a manner the changeover operation for low speed and high speed is carried out be engaging and disengaging alternatively the multiple disc clutch and brake band.

The foregoing explanation will be clearer from a study of Table 1.

TABLE 1
Low speed—Reduction

| Part | Part number | Status |
| --- | --- | --- |
| Brake band | 36 | Engaged. |
| Clutch drum | 32 | Locked. |
| Sun gear | 24 | Stationary. |
| Short pinion | 23 | Revolves around sun gear. |
| High speed—Equal speed on input and output sides | | |
| Clutch piston | 35 | Engaged. |
| Disc clutch | 3 | Do. |
| Brake band | 36 | Disengaged. |
| Sun gear | 24 | Rotates. |
| Long pinion | 21 | Meshes with sun gear 21. |
| Short pinion | 23 | Meshes with sun gear 24. |

Figure 3:
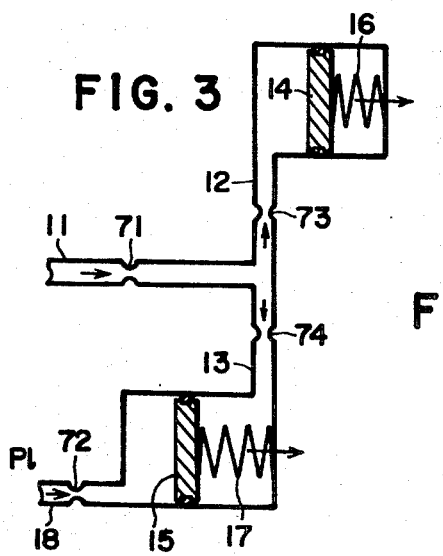
FIG. 3 represents a conventional hydraulic control diagram.

FIG. 3 shows a conventional hydraulic control diagram, 11 is a hydraulic pressure line, at the left side of which a change over valve is connected (not shown in the drawing).

As hereinbefore explained this change over valve is automatically changed over in accordance with the vehicle speed and depressed amount of the accelerator pedal. This change over valve communicates the pressure line 11 to the exhaust port of the oil sump at low speed gear and communicates it to the hydraulic pressure source at high speed gear. 12, 13 are branch pipe-line connected to the common line 11 to apply the hydraulic pressure to a clutch piston 14 and a brake servo piston 15 respectively. 16, 17 are return springs and the spring 16 acts to move the clutch piston 14 leftwards to release the clutch when the end portion of the pipe-line 11 is opened to the oil sump by the change over valve.

On the opposite surface to the brake servo piston 15 a hydraulic pressure $P_e$ is continuously being applied through a pipe-line 18, which acts to move the piston 15 rightwards against the force of spring 17 to engage the brake band when the pipe 11 is opened. In consequence, whenever hydraulic pressure is applied from the pipe-line 11, the piston 15 is moved to the left side by the pressure under cooperation with the spring 17 thus to disengage the brake band.

Respective pipe-lines 11, 12, 13, 18 are provided each with one fixed orifices 71 to 74. The orifice 71 applies the hydraulic pressure to the clutch piston 14 and brake servo piston 15 respectively through the orifices 73, 74 after suitably lowering the supply hydraulic pressure. The operating time constants at time of change-over from low speed gear to high speed gear may be regulated by suitably selecting the resistance coefficients of these orifices 73 and 74, for instance by applying the hydraulic pressure in the direction of the arrow, however the operating time constants at time of the inverse directional change-over have already been fixed, so that it can not be expected to carry out such a desirable change-over operation that the brake band is slowly engaged after disengaging the multiple disc clutch. For this reason, in the conventional hydraulic control circuit it has so far been very difficult to prevent large shock at time of automatic speed change.

According to this invention, as shown in FIG. 4, for instance a fluid diode 75 is inserted in place of the orifice 74 in FIG. 3. This fluid diode 75 has an output duct 76 which is connected in the branch pipe-line 13 and a control port 77. This resistance characteristic, as shown in FIG. 5, shows the tendency of curve A in the direction for the output duct 76 from the control port 77, so that the resistance is high, while it shows the tendency of curve B in the direction from the control port 77 from the output duct 76 and so the resistance is low. Therefore, if a hydraulic pressure P is applied to the line 11 in FIG.

4, the hydraulic pressure of branch lines 12, 13 rises because of orifice 71 according to its resistance coefficient and works on the clutch piston 14 and servo piston 15 respectively through the orifice 73 and the fluid diode 75. In this case, as explained in FIG. 5, the fluid diode 75 shows a comparatively large quantity of flow by a slight pressure difference ΔP according to the curve B, so that a desirable hydraulic pressure can be applied to the right side of the servo piston 15 with a small operating time constant $T_1$. While the hydraulic pressure applied to the left side of the clutch piston through the orifice 73 rises, for instance with a time constant $T_2$ longer than the operating time constant of the servo piston 15. Therefore, the brake band can be quickly disengaged, whereas the multiple disc clutch is slowly engaged. Thus, the gear shift from low speed to high speed can be performed with an extremely slight shock.

If the end of the pipe-line 11 is opened to the oil sump by operation of the change over valve (not shown) the pressure oil acting on the clutch piston 14 and brake servo piston 15 is discharged through the orifice 73, fluid diode 75 and common orifice 71 respectively. The discharge time constant at the clutch side shows the above operating time constant $T_2$, however that at the brake band side shows the inverse directional resistance characteristic of curve A of the fluid diode 75, of which the time constant $T_3$ becomes long. In this occasion, the resistance characteristic of the orifice 73 or the fluid diode 75 is so adjusted that the time constant $T_3$ may be longer than the time constant $T_2$, whereby the multiple disc clutch is disengaged in advance and the brake band is slowly engaged later, thus enabling the gear shift from high speed to low speed to perform smoothly with an extremely slight shock.

The same operation as that just described can also be accomplished my inserting the fluid diode in place of the orifice 73 in FIG. 3 to permit the engaging and disengaging operations of the clutch to provide a different time constant according to the time of supplying and discharging the pressure oil.

Moreover, by inserting two fluid diodes as shown in FIG. 9 in place of both orifices 73, 74 in FIG. 3, the shock can be more effectively suppressed, that is, such a connection is formed that the fluid diode at the clutch side may provide a long operating time constant and a short discharge time constant while that at the brake band side may provide a short operating time constant and a long discharge time constant and moreover the speed changing times in both directions may be made equal to each other.

FIG. 6 shows a pressure diagram when a vortex amplifier is inserted in place of the orifice 74 in FIG. 3 and the branch pipe-line 13 is connected with the output duct 86 for the clutch piston side and supply port 88 for the brake piston side. The hydraulic pressure $P_g$ according to the vehicle speed is applied to the control port 87. As a hydraulic pressure $P_g$, for example, the governor oil pressure is employed. Looking now at FIG. 7 and assuming $P_1$ is a hydraulic pressure at the supply port 88 while $P_2$ is a hydraulic pressure; and at the output duct 86, expressing $\Delta P = P_g - P_1$ on the abscissa, the pressure difference between the supply port 88 and output duct 86 $P_1 - P_2$ on the ordinate, then, as shown in FIG. 7, when the vehicle speed is low the pressure difference is small, so that the resistance is low. When the vehicle speed is high the pressure difference becomes large, so that the control characteristic having a high resistance can be obtained.

For instance, under the high speed gear condition as the hydraulic pressure P being applied, the multiple disc clutch being engaged and the brake band being disengaged, if the gear-shift into the low speed is carried out at the low vehicle speed, since the resistance of the amplifier 85 is low the discharge time constants of the brake band and multiple disc clutch approach each other. Accordingly, at the low vehicle speed the brake is engaged in succession to releasing of the multiple disc clutch and the gear change is instantaneously carried out.

Whereas, when the resistance of amplifier 85 is high at the high vehicle speed, the time constant of discharge oil of the brake band becomes much longer than that of the multiple disc clutch. Therefore, after the clutch has been disengaged, the brake band is extremely slowly engaged resulting in performing the gear change quite smoothly.

FIG. 8 illustrates a relationship between the pressure and the time. Similar to the above, in place of the orifice 73 or both orifices 73, 74, one or two of the fluid amplifiers may be employed, whereby the gear change can be accomplished smoothly in the desired speed-changing time.

What is claimed is:

1. In a fluid automatic transmission composed of a torque converter, a planetary gear system which can be interconnected to form gear trains corresponding to first and second speeds coupled to the output shaft of said torque converter, a multiple disc clutch and a brake band for controlling the gear trains forming said first and second speeds, said multiple disc clutch and brake band having pipe lines connected thereto and being engaged or disengaged by having applied thereto the hydraulic pressure in said pipelines for changing over the speed ratio of said gear system, the improvement therein wherein a pure fluid diode element is provided on at least one of the pipe-lines for applying or releasing the hydraulic pressure to the said multiple disc clutch and brake band respectively, whereby on changing over the above gear system from said first speed to said second speed the multiple disc clutch is slowly engaged after the brake band has been disengaged and on changing over said gear system from second speed to said first speed the brake band is slowly engaged after the multiple disc clutch has been disengaged, said fluid diode being in each pipe line to said clutch and brake band respectively.

2. In a fluid automatic transmission composed of a torque converter, a planetary gear system which can be interconnected to form gear trains corresponding to first and second speeds, coupled to the output shaft of said torque converter, a multiple disc clutch and a brake band for controlling the gear trains forming said first and second speeds, said multiple disc clutch and brake band having pipe lines connected thereto and being engaged or disengaged by having applied thereto the hydraulic pressure in said pipelines for changing over the speed ratio of said gear system, the improvement therein wherein a pure fluid amplifier element is provided on at least one of the pipe-lines for applying or releasing the hydraulic pressure to the said multiple disc clutch and brake band respectively, whereby on changing over the above gear system from said first speed to said second speed the multiple disc clutch is slowly engaged after the brake band has been disengaged and on changing over said gear system from second speed to said first speed the brake band is slowly engaged after the multiple disc clutch has been disengaged.

3. In an automatic transmission having a planetary gear system, at least two fluid operated devices for respectively establishing different drive ratios through the gear system and pressure fluid supply means for simultaneously engaging one of the fluid operated devices and disengaging the other of the fluid operated devices to effect a change in drive ratios, means connected between said fluid supply means and the fluid operated devices for producing a flow rate differential between the fluid conducted to said fluid operated devices during the change in drive ratios, including fluidic amplifier means for increasing the flow rate of fluid in only one direction to one of the fluid operated devices.

4. The combustion of claim 3 including speed signal means connected to the fluidic amplifier means for varying the flow rate differential.

References Cited

UNITED STATES PATENTS

| | | | |
|---|---|---|---|
| 2,766,639 | 10/1956 | Rosenberger | 192—18X |
| 2,907,232 | 10/1959 | Duffy | 74—761X |
| 3,233,478 | 2/1966 | General et al. | 74—761 |
| 3,292,454 | 12/1966 | Konrad et al. | 74—761X |
| 3,324,891 | 6/1967 | Rhoades | 137—81.5X |
| 3,392,739 | 7/1968 | Taplin et al. | 91—3X |
| 3,474,670 | 10/1969 | Rupert | 137—81.5X |

OTHER REFERENCES

Product Engineering Dec. 6, 1965, p. 70, "Other Fluidic Hardware."

CARLTON R. CROYLE, Primary Examiner

T. C. PERRY, Assistant Examiner

U.S. Cl. X.R.

192—18A; 91—3